United States Patent
Langford

[19]

[11] Patent Number: 6,004,642

[45] Date of Patent: Dec. 21, 1999

[54] INTERNALLY SEPARABLE TAPE LAMINATE

[75] Inventor: Nathaniel P. Langford, Somerset, Wis.

[73] Assignee: 3M Innovative Properties Company, St. Paul, Minn.

[21] Appl. No.: 08/746,351

[22] Filed: Nov. 8, 1996

[51] Int. Cl.$^6$ ........................................ C09J 7/02
[52] U.S. Cl. .................. 428/40.1; 248/205.3; 248/467; 428/42.2; 428/42.3; 428/308.8; 428/317.7; 428/507
[58] Field of Search .................. 428/40.1, 42.2, 428/42.3, 507, 308.8, 317.7; 248/467, 205.3

[56] References Cited

U.S. PATENT DOCUMENTS

| | | | |
|---|---|---|---|
| 3,675,844 | 7/1972 | Sorrell | 428/40.1 |
| 4,024,312 | 5/1977 | Korpman | 428/343 |
| 4,310,137 | 1/1982 | Frye | 248/467 |
| 4,599,260 | 7/1986 | Truskolaski et al. | 428/207 |
| 4,673,611 | 6/1987 | Crass et al. | 428/215 |
| 4,756,498 | 7/1988 | Frye | 248/205.3 |
| 5,409,189 | 4/1995 | Luhmann | 248/205 |
| 5,491,012 | 2/1996 | Luhmann et al. | 428/40 |
| 5,496,599 | 3/1996 | Schwartz et al. | 428/35.7 |
| 5,507,464 | 4/1996 | Hamerski et al. | 248/683 |
| 5,516,581 | 5/1996 | Kreckel et al. | 428/317.3 |

FOREIGN PATENT DOCUMENTS

| | | |
|---|---|---|
| 77 24 383 | 11/1977 | Germany . |
| 33 31 016 A1 | 8/1983 | Germany . |
| 43 39 604 | 11/1993 | Germany . |
| 44 00 526 | 7/1995 | Germany . |
| 195 42 212 A1 | 11/1995 | Germany . |
| 8-3970 | 2/1996 | Japan . |

OTHER PUBLICATIONS

U.S. Patent Application Serial No. 08/308,937 filed Sep. 20, 1996.
International Search Report PCT/US97/03016.

*Primary Examiner*—Nasser Ahmad
*Attorney, Agent, or Firm*—David B. Patchett

[57] ABSTRACT

A tape laminate comprising an internally separable layer having first and second opposite major anchor surfaces, which separable layer has an internal static shear strength in a direction parallel to its anchor surfaces that allows it to support a significant weight (e.g., at least 6 pounds per square inch), and has an internal dynamic tensile strength in a direction generally normal to its anchor surfaces of no greater than 40 pounds per square inch. The major anchor surfaces of the separable layer are bonded to the opposed surfaces of objects (which bonding can be done with strips of stretch release adhesive) so that the laminate can support one object from the other against a static force generally parallel to said anchor surfaces of at least 6 pounds per square inch, whereas the separable layer can be internally separated by a dynamic separating force normal to said anchor surfaces of no greater than about 40 pounds per square inch to separate the objects.

25 Claims, 4 Drawing Sheets

INTERNALLY SEPARABLE TAPE LAMINATE

FIELD OF THE INVENTION

The present invention relates to tape structures having opposite major adhesive surfaces that are adapted to adhere together the opposed surfaces of two objects.

BACKGROUND OF THE INVENTION

Laminated tape structures including a central layer of polymeric film or foam with layers of adhesive on its opposite major surfaces (e.g., Wallsaver (t.m.) Removable poster tape, 3M (t.m.) Automotive attachment Tape, or 3M (t.m.) Acrylic Foam Tape, all available from; Minnesota Mining and Manufacturing Company, St. Paul, Minn.) have been used to bond the opposed surfaces of two objects together, such as to bond a wall hanging such as a poster, plaque, or a picture to a wall. When such a tape structure in which the adhesive is a high tack pressure sensitive adhesive (e.g., the 3M (t.m.) Acrylic Foam Tape) is used for that purpose, it is often difficult to later separate the objects. The tape structure is positioned in a very narrow area between the objects where it is not readily accessible, particularly when the tape structure is between a rigid wall hanging and a wall. Typically, an attempt is made to either cut the tape structure in half with a knife or similar implement poked between the objects, or one object (e.g., a wall hanging) is twisted on or pulled from the other object (e.g., a wall), often resulting in damage to one or both of the objects.

Laminated structures are described in U.S. Pat. No. 4,310,137 (Frye) that include outer attachment layers having opposite major surfaces defined by pressure sensitive adhesive that can be adhered to the opposed surfaces of closely spaced objects so that the laminated structures support one object from the other, and a separable layer of non-fusible porous material such as tissue paper between the outer attachment layers that can be separated by an outward exertion on one of the outer attachment layers away from the other.

Strips having opposite major surfaces at least partially defined by pressure sensitive adhesive have been developed that can be used to bond objects together, and can subsequently be stretched by pulling on tab portions at ends of the strips to cleanly separate the adhesive bonds between the strips and the objects they had previously joined (e.g., see U.S. Pat. No. 5,409,189 (Luhmann), U.S. Pat. No. 5,507,464 (Hammerski et al) and U.S. Pat. No. 5,516,58(Kreckel et al), and U.S. patent application Ser. No. 08/308,937 (Bries et al). While such stretch releasable strips work well, the tab portion at the end of such a strip joining two or more objects should be positioned where it can be engaged by a person who later wishes to separate the objects. One of the objects can be specially made with a removable portion that covers that tab portion (see U.S. Pat. No. 5,507,464, Hammerski et al), or, if one of the objects is flexible, that flexible object may be bent to afford access to that tab portion. In many instances where rigid objects are joined, however, it may be necessary to allow the tab portion to project from between the joined objects to afford such engagement with that tab portion to remove the stretchable strip from between the objects. Such a projecting tab portion can be aesthetically objectionable.

SUMMARY OF THE INVENTION

The present invention provides a tape structure that can be used to bond together the opposed surfaces of objects including rigid objects (e.g., to bond plaques or framed pictures to walls) with no portion of the tape structure projecting from between the objects, and which subsequently affords easy separation of those objects without damage to either of them.

The tape structure according to the present invention comprises an internally separable layer having opposite major anchor surfaces. The anchor surfaces are adapted to be bonded to the opposed surfaces of objects (e.g., by layers of pressure sensitive or other types of adhesive on the anchor surfaces or by other means such as heat fusion or the use of stretch releasable strips as is described below). The internally separable layer has an internal static shear strength in a direction parallel to its anchor surfaces that is adapted to support one of the objects to which it is attached from the other with its anchor surfaces vertically disposed (e.g., preferably has a static shear strength parallel to its anchor surfaces that is about equal to or exceeds the maximum static shear strength that pressure sensitive adhesive will develop with normal surfaces to which it can be adhered), and has an internal dynamic tensile strength in a direction generally normal to its anchor surfaces that will afford internal separation of the separable layer by pulling apart the objects it has joined without damaging the surfaces of those objects (e.g., an internal dynamic tensile strength, dependent on the material used in the separable layer, of no greater than about 40 pounds per square inch and preferably of no greater than about 30 pounds per square inch measured as described herein if the tape structure is to be used to adhere an object to a strong substrate such as a ceramic material or metal with a baked on paint finish, or of about 8 to 10 pounds per square inch if the tape structure is to be used to adhere an object to a relatively weak substrate such as wall paper).

In an embodiment of the laminate adapted to be easily and cleanly removed from one or both of the objects it attaches together, the laminate comprises one or two stretch releasable strips each having opposite inner and outer major surfaces with its outer surface being defined by pressure sensitive adhesive that can be adhered to an object, and being stretchable by being manually pulled at an end tab portion to release adhesive engagement of its outer surface to an object to which it has been adhered. The inner major surfaces of two such strips can be bonded to the anchor surfaces of the separable layer. When the adhesives on the outer major surfaces of the two strips are then adhered to the opposed surfaces of two objects the laminate can support one object from the other against a force generally parallel to those anchor surfaces (e.g., can support a wall hanging from a wall), however the separable layer can be internally separated, after which the strips can both be stretched by manually engaging their tab portions to cleanly separate the strips from both objects. Thus, there is no need to position the tab portion of the tape laminate so that it can be engaged by a person before the separable layer is internally separated during the process of separating one object from the other. A suitable stretch releasable adhesive strip is described in U.S. patent application Ser. No. 08/308,937 (Bries et al.) which provides an adhesive tape comprising a backing and a first layer of a pressure-sensitive adhesive composition coated on at least one surface of the backing. The backing comprises a layer of polymeric foam which is about 30 to about 1000 mils (0.76 mm to about 25 mm) in thickness and has a lengthwise elongation at break of from about 50% to about 1200%. The tape is capable of being firmly bonded to a substrate and thereafter being removable therefrom after being stretched at an angle no greater than about 35° (preferably no greater than about 10°) from the surface of the substrate without the backing rupturing prior to the removal of the tape from the substrate and without leaving substantial pressure-sensitive adhesive residue on the substrate.

Examples of materials from which the separable layer can be made include foam, paper, nonwoven materials and corrugated paper. Such materials vary greatly in their properties, but certain of these materials have been found that are suitable for use as the separable layer because they are both (1) internally stable when exposed for a long time to a static force generally parallel to their major or anchor surfaces that is about equal to or exceeds the maximum shear force that can be developed between a layer of pressure sensitive adhesive on one of their anchor surfaces and a substrate, and (2) internally separable when exposed to a dynamic separating force normal to those anchor surfaces that is within a range that will not damage a substrate to which the separable layer is adhered by the adhesive. The use of a separable layer of nonwoven polymeric fibers instead of a separable layer of cellulose material has the advantage that the strength properties of the separable layer are not greatly affected by exposure to water such as by damp environments or changes in humidity, and that the separable layer can be custom constructed (within limits) to have a desired combination of static shear and dynamic tensile properties by heat sealing together different portions of the polymeric fibers in the separable layer.

The area and the material of the internally separable layer should be selected so that the force required to separate it into two portions by pulling it at a right angle to its anchor surfaces can be readily applied by average adults (e.g., a force of 10 to 30 pounds), unless a person will be expected to separate the internally separable layer by using a pry bar or the like. The force required to separate an internally separable layer of a given material will be reduced from that required to pull the separable layer apart only in a direction at right angles to its anchor surfaces, however, if the internally separable layer is used in a tape laminate to which pealing and/or torsional forces in addition to forces normal to its anchor surfaces can be applied as it is separated. This will occur, for example, if tape laminates are used to adhere only the top portion of a rigid picture frame to a wall so that the bottom of that picture frame can be pulled up on and/or pushed to one side while that frame is being pulled away from the wall to separate the internally separable layer, thereby applying such a combination of normal and pealing and/or torsional forces to the internally separable layer as it is separated.

BRIEF DESCRIPTION OF DRAWING

The present invention will be further described with reference to the accompanying drawing wherein like reference numerals refer to like parts in the several views, and wherein.

DETAILED DESCRIPTION OF THE INVENTION

Figure 1:
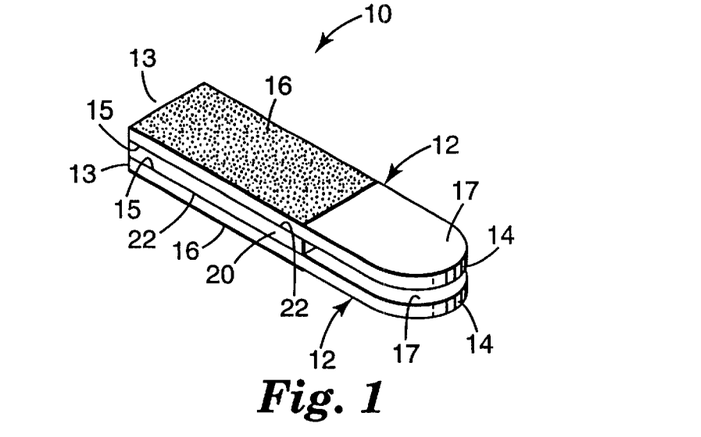
FIG. 1 is a perspective view of a first embodiment of a tape laminate according to the present invention.
Figure 2A:
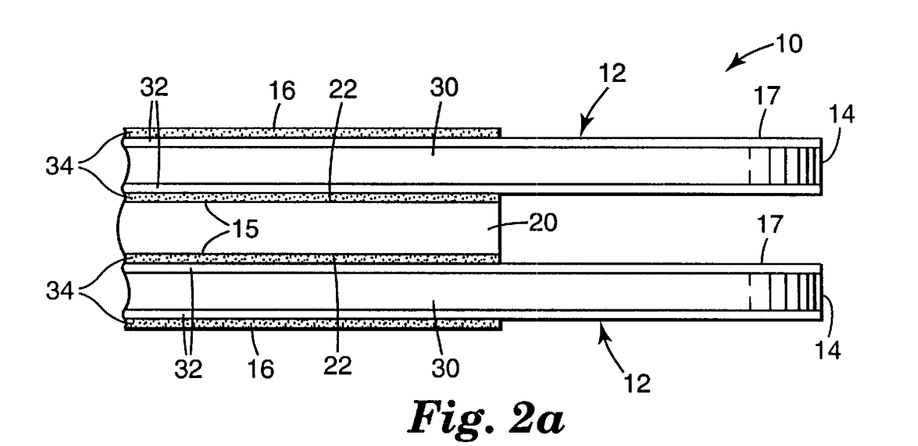
FIG. 2a is an enlarged fragmentary side view of the tape laminate of FIG. 1.

Referring now to FIGS. 1 and 2a of the drawing, there is illustrated a first embodiment of a tape laminate according to the present invention generally designated by the reference numeral 10.

Generally, the tape laminate 10 comprises first and second strips 12, each strip 12 having opposite ends 13 and 14, inner and outer opposite major adhesive surfaces 15 and 16 extending from its end 13 toward its end that are both defined by pressure sensitive adhesive, and a manually engageable tab portion 17 at its end 14. Each strip 12 is stretchable by being pulled at the tab portion 17 to release engagement of its adhesive surfaces 15 and 16 from substrates to which they are adhered. The tape laminate 10 also includes an internally separable layer 20 having opposite first and second major anchor surfaces 22. Each of the strips 12 has its inner adhesive surface 15 bonded or adhered to a different one of the opposite anchor surfaces 22 of the separable layer 20. The separable layer 20 has an internal static shear strength in a direction parallel to its anchor surfaces 22 that is adapted to support objects between which it is attached in that direction (e.g., preferably a shear strength that about equals or exceeds the highest shear strength that the pressure sensitive adhesive can develop with surfaces to which it is applied (e.g., 6 pounds per square inch)), and has an internal dynamic tensile strength in a direction generally normal to its anchor surfaces 22 selected so that it will afford internal separation of the separable layer by pulling such objects apart in a direction generally normal to the anchor surfaces 22 and to the surfaces of the objects to which the tape laminate 10 is adhered without damaging those surfaces of the objects (e.g., an internal dynamic tensile strength of no greater than about 40 pounds per square inch and preferably no greater than about 30 pounds per square inch measured as described herein if the tape structure is to be used to adhere an object to a strong substrate such as a ceramic material or metal with a baked on paint finish; or an internal dynamic tensile strength of no greater than about 10 pounds per square inch if the tape structure is to be used to adhere an object to a relatively weak substrate such as is provided by some wall papers, particularly if the strips could be adhered to a portion of that wall paper that was not well adhered to the wall behind it).

Figure 3:
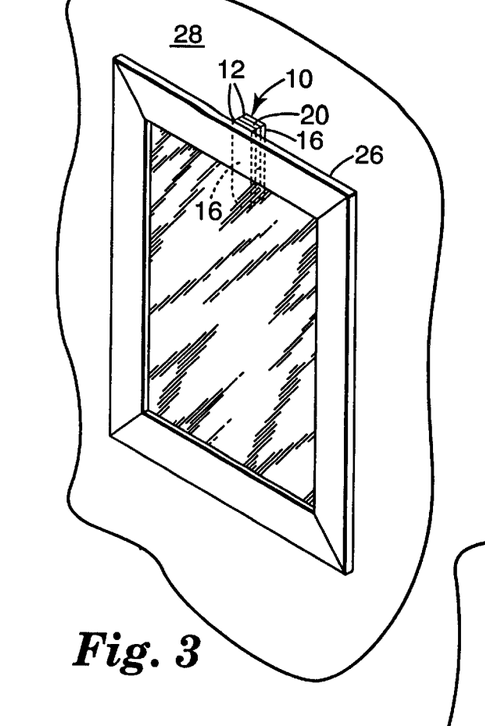
FIG. 3 is a perspective view illustrating a wall hanging attached to a wall by the tape laminate of FIG. 1
Figure 4:
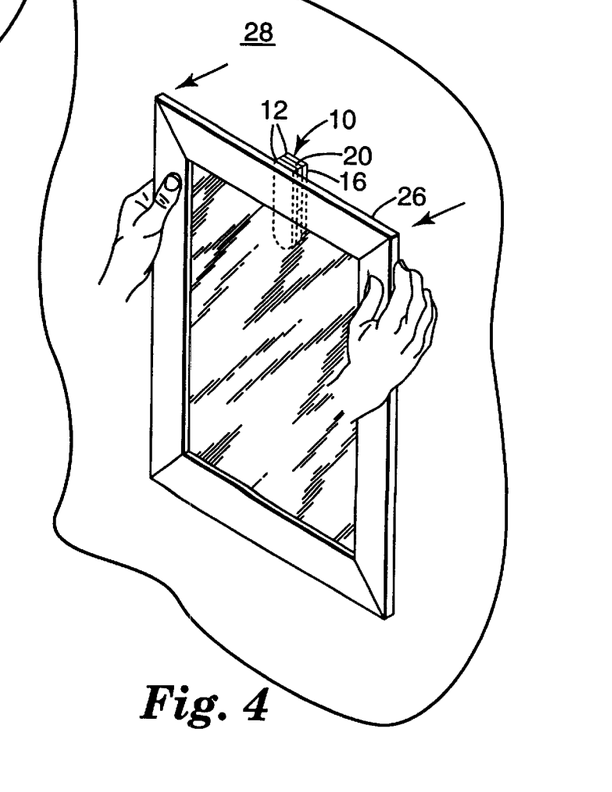
FIG. 4 is a perspective view similar to FIG. 3 that illustrates removing the wall hanging from the wall by separating portions of the tape laminate of FIG. 1.
Figure 5:
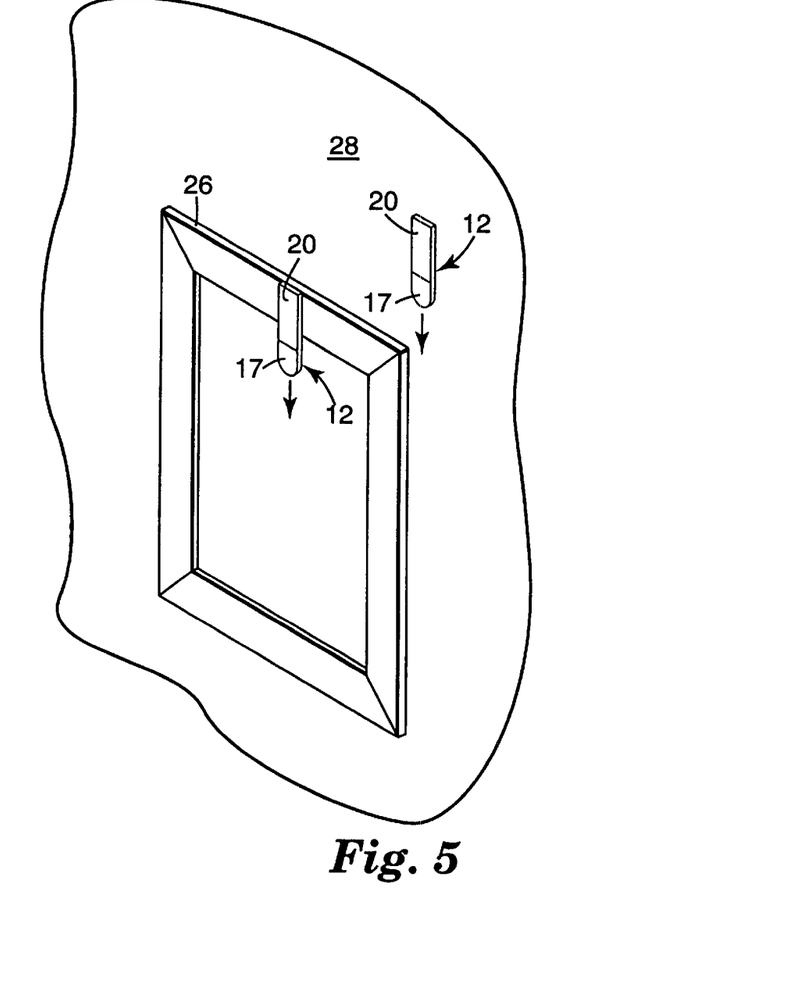
FIG. 5 is a perspective view illustrating removing separated portions of the tape laminate of FIG. 1 from the wall hanging and wall illustrated in FIGS. 3 and 4 after the wall hanging has been removed from the wall.

When, as is illustrated in FIG. 3, the outer adhesive surfaces 16 of the strips 12 are adhered to the opposed surfaces of two objects such as a framed picture 26 and a wall 28, the laminate 10 can support one of the objects (i.e., the picture 26) from the other object (i.e., the wall 28) against a continuous force applied in a direction generally parallel to the anchor surfaces 22 of the separable layer 20 and the opposed surfaces of the joined objects 26 and 28. As is illustrated in FIG. 4, however, the objects 26 and 28 can again be separated by applying a separating force normal to those anchor surfaces 22 and opposed surfaces of the objects 26 and 28 to internally separate the separable layer 20. After separation of the separable layer 20, the strips 12 can each be stretched by manually engaging and pulling on their tab portions 17 in the direction indicated by the arrows in FIG. 5 to cleanly separate the strips 12 and the portions of the separable layer 22 adhered thereto from the objects 26 and 28.

Preferably, as illustrated in FIG. 2a, the strips 12 used in the tape laminate 10 are those described in U.S. patent application Ser. No. 08/308,937 (Bries et al) filed Sep. 20, 1994, the content whereof is incorporated herein by reference. Generally those strips 12 comprise a central layer 30 of polymeric foam (e.g., polyolefin foam), two layers 32 of stretchable polymeric film (e.g., polyethylene or polypropylene film, with linear low density and ultra linear low density polyethylene film being preferred) bonded along opposite major surfaces of the layer 30 of foam, and two layers 34 of adhesive that define the major adhesive surfaces 15 and 16 and are adhered along major surfaces of the layers 32 of film opposite those bonded alone the layer 30 of foam. The central foam layer 30 is about 30 to about 1000 mils (0.76 mm to about 25 mm) in thickness and has a lengthwise elongation at break of from about 50% to about 1200%. The tape is capable of being firmly bonded to a substrate and thereafter being removable therefrom after being stretched at an angle no greater than about 35° (preferably no greater than about 10°) from the surface of the substrate without the backing rupturing prior to the removal of the tape from the substrate and without leaving substantial pressure-sensitive adhesive residue on the substrate. The strips 12 are about three quarter inch wide, as a wider strip is too difficult to stretch to cause release of the layers 34 of adhesive. The layers 34 of adhesive on the strip 12 can be made as long as necessary to provide the desired amount of holding force on a substrate.

Figure 2B:
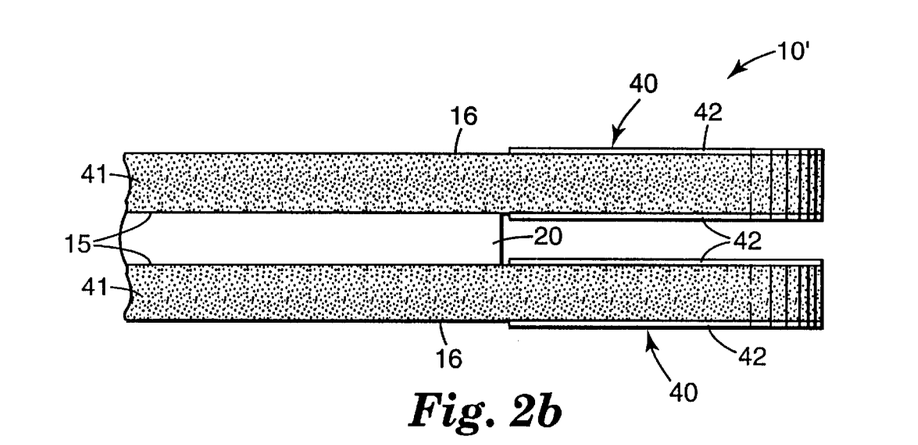
FIG. 2b is an enlarged fragmentary side view of an alternate structure for the tape laminate of FIG. 1.

Alternatively, the strips 12 could consist of two layers of adhesive that define the major adhesive surfaces 15 and 16 adhered along opposite major surfaces of a single layer of stretchable polymeric film, or (as is illustrated in FIG. 2b) could be the strips 40 described in U.S. Pat. No. 5,409,189 (Luhmann), which strips 40 each include a single layer 41 of pressure sensitive adhesive that would define the two major adhesive surfaces 15 and 16, and each have polymeric film coverings 42 over their projecting tab end portions to keep them from adhering together and to provide non-sticky surfaces for their tab end portions by which the layers 41 of pressure sensitive adhesive can be stretched to cause them to release from surfaces between which they have been adhered. Also, the strips 12 could be modified so that only their outer surfaces 16 are defined by a layer of pressure sensitive adhesive, and their inner surfaces could be bonded to the anchor surfaces 22 of the separable layer 20 by other means such as a hot melt or radiation curable adhesive, or thermal bonding. Such other means of bonding might reduce the cost of production of the tape laminate 10.

Materials from which the separable layer 20 can be made include foam, paper, nonwoven materials and corrugated paper. From experimentation it has been determined that when the tape laminate 10 is used to attach an object to the surface of wallpaper or unpainted drywall, the dynamic tensile force required to internally separate the separable layer 20 should be no more than about 8 to 10 pounds per square inch to preclude the possibility of damage to such surfaces. In contrast, when the tape laminate 10 is used to attach an object to some painted surfaces (e.g., the surface of a painted cement block wall, or a metal cabinet with baked on paint) or to the surface of glass or ceramic material, the dynamic tensile force required to internally separate the separable layer 20 can be up to 30, 35, or even 40 pounds per square without causing damage to such surfaces. When the tape laminate 10 is used to attach an object to the surface of yet other types of materials (e.g., wood or veneer) the dynamic tensile force required to internally separate the separable layer 20 should be in the range of about 20 pounds per square to restrict damage to those surfaces. Different embodiments of the tape laminate 10 can be made with separable layers 20 of different materials that require different dynamic tensile forces to internally separate the separable layer 20 as may be appropriate for use of the tape laminate 10 on different substrates. Such different embodiments of the tape laminate 10 can be coded by making them in different shapes and/or colors to indicate the substrates on which their use is appropriate.

Tests were conducted to determine the dynamic force required to internally separate or split layers of different materials being considered for use in the separable layer 20 by using a model No. 1122 "Instron" (t.m.) machine to apply dynamic tensile forces to those different materials in a direction normal to their major surfaces, and to apply dynamic shear forces to those different materials in a direction parallel to their major surfaces (i.e., the major surfaces that would provide the anchor surfaces 22 if the tested materials were used as the separable layer 20 in the tape laminate 10). Tape laminates 10 of the type illustrated in FIGS. 1 and 2a were made using each of the different materials as the separable layer 20 between the two strips 12. In each of the strips 12 the layer 30 of foam (which was a polyethylene/EVA copolymer) and the layers 32 of film (which were of polyethylene) were heat laminated together, and the layers of adhesive 34 had major surfaces ½ inch by 2 inches in size and were of a rubber based adhesive of the type described in U.S. patent application Ser. No. 08/308, 937 (Bries et al) coated at a dry weight of 16.5 grains per 24 square inch area. The adhesive surfaces 16 were firmly adhered to the surfaces of clean steel plates adapted to be mounted on the "Instron" (t.m.) machine so that the "Instron" (t.m.) machine could apply dynamic forces to the separable layers 30 in either the shear direction (i.e., parallel to their anchor surfaces 22) or tensile direction (i.e., normal to their anchor surfaces 22). The "Instron" (t.m.) machine was set to open at a rate of 0.5 inches per minute.

Before testing the tape laminates 10 including the separable layers 20 of the materials to be tested, single strips 12 of the type described above were adhered between such steel plates, tested, and found to withstand a dynamic tensile force of approximately 80 pounds per square inch and a dynamic shear force of approximately 105 pounds per square inch before failure. These dynamic tensile and shear forces for the strips 12 exceeded the values for all of the dynamic tensile and shear forces of the various materials tested for use as the separable layer 20.

Table I below provides the results of the tests of the various materials tested for possible use as the separable layer 20.

TABLE I

| SEPARABLE LAYER 20 MATERIAL | DYNAMIC TENSILE FORCE AT SEPARATION pounds per sq. inch | DYNAMIC SHEAR FORCE AT SEPARATION pounds per sq. inch |
| --- | --- | --- |
| 50 lb. Kraft Paper | 43 | 78 |
| Single Ply Facial Tissue | 45 | 78 |
| Standard Copying Paper | 40 | 93 |
| Single Ply Paper Towel | 15 | 20 |

TABLE I-continued

| SEPARABLE LAYER 20 MATERIAL | DYNAMIC TENSILE FORCE AT SEPARATION pounds per sq. inch | DYNAMIC SHEAR FORCE AT SEPARATION pounds per sq. inch |
|---|---|---|
| 0.75 oz./sq. yd. PET Spunbond | 20 | 29 |
| 0.7 oz./sq. yd. PET Spunbond | 36 | 57 |
| 1.4 oz./sq. yd. PP Spunbond/PE Meltblown laminate | 14 | 36 |
| 50 gm./sq. yd. Spunbond PET/Nylon laminate | 32 | 40 |
| 0.5 oz./sq. yd. Nylon Spunbond | 35 | 55 |
| 60 gm./sq. m. PP Spunbond | 20 | 46 |
| 1.0 oz./sq. yd. PP Spunbond | 20 | 27 |
| 1.5 oz./sq. yd. PP Spunbond | 12 | 27 |
| 60 gm./sq. yd. PET Card and Powder Bond | 6 | 11 |
| 25 gm./sq. yd. PET Card and Powder Bond | 32 | 42 |
| 30 gm./sq. yd. PET Hydro entangled | 29 | 36 |
| 56 gm./sq. yd. Rayon/PET Hydro entangled laminate | 23 | 28 |
| 34 gm./sq. yd. Rayon/PET Hydro entangled laminate | 40 | 67 |
| 1.26 oz./sq. yd. HDPE Flashspun | 8 | 20 |
| Corrugated Paper | 9 | 30 |

The 50 lb. Kraft Paper was that commercially available from Anchor Paper, St. Paul, Minn. The Single Ply Facial Tissue was the facial tissue commercially available under the trade designation "Kleenex" from Kimberly-Clark, Neenah, Wis. The Copying Paper was that commercially available under the trade designation "Matrix" from Crown Zellerbach, Vancouver, Wash. The Single Ply Paper Towel was that commercially available under the trade designation "Wypall" from Scott, Philadelphia, Pa. The 0.75 oz./sq. yd. PET (i.e., polyethylene terephthalate) Spunbond was that commercially available under the trade designation "style YdpF straight No. 2011" from Reemay, Inc., Old Hickory, Tenn. The 0.7 oz./sq. yd. PET Spunbond was that commercially available under the trade designation "style 4dpf straight No. 2011" from Reemay, Inc., Old Hickory, Tenn. The 1.4 oz./sq. yd. PP (i.e., polypropylene) Spunbond/PE (i.e., polyethylene) Meltblown laminate was that commercially available under the trade designation "Securon (t.m.)" from Fiberweb Corporation, Newton, Mich. The 50 gm./sq. yd. Spunbond PET/Nylon 6 sheath laminate was that commercially available under the trade designation "style: Colback (t.m.) NHD-50" from AKZO Nobel Fibers, The Netherlands. The 0.5 oz./sq. yd. Nylon Spunbond was that commercially available under the trade designation "style: PBNII 302012" from Cerex, Cantonment, Fla. The 60 gm./sq. yd. PP Spunbond was that commercially available under the trade designation "style: Lutrasil LS 4160" from Carl Freudenberg, Weinheim, Germany. The 1.0 oz./sq. yd. PP Spunbond was that commercially available under the trade designation "Celestra Nonwoven" from Fiberweb Group, Simpsonville, S.C. The 1.5 oz./sq. yd. PP Spunbond was that commercially available under the trade designation "style: Homopolymer SB" from Polybond, The British Petroleum Co., London, England. The 60 gm./sq. yd. PET Card and Powder Bond was that commercially available under the trade designation "style: Filtration and Apparel B9260 Loftable" from HDK Industry, Rogersville, Tenn. The 25 gm./sq. yd. PET Card and Powder Bond was that commercially available under the trade designation "style: Comoft Liner B9025" from HDK Industry, Rogersville, Tenn. The 30 gm./sq. yd. PET Hydro entangled material was that commercially available under the trade designation "style: Versalon 140-070" from Veratec, Walpole, Mass. The 56 gm./sq. yd. Rayon/PET Hydro entangled laminate was that commercially available under the trade designation "style: Autowipe 140-102" from Veratec, Walpole, Mass. The 34 gm./sq. yd. Rayon/PET Hydro entangled laminate was that commercially available under the trade designation "style: Versalon 140-093" from Veratec, Walpole, Mass. The 1.26 oz./sq. yd. HDPE (i.e., high density polyethylene) Flashspun was that commercially available under the trade designation "style: Tyvek 1042B" from DuPont, Wilmington, Del. The Corrugated Paper had a total thickness of about 0.1185 inch or 0.301 centimeter, two outer layers each 0.009 inch or 0.023 centimeter thick, and a 0.01 inch 0.025 centimeter thick middle layer shaped into straight, parallel, regular, and equally curved ridges and hollows with corresponding ridges spaced apart by about 0.25 inch or 0.64 centimeter.

These tests indicated that separable layers of both cellulose (i.e., Single Ply Paper Towel and Corrugated Paper) and of nonwoven polymeric materials (i.e., the spunbond, spunbond/meltblown laminate, card and powder bond, hydro entangled, hydro entangled laminate, and flashspun materials) separated at dynamic tensile forces that were in the range useful in the present invention. We believe that the tested or similar nonwoven materials entirely or mostly of thermoplastic fibers are the most useful as the separable layer in the tape laminate according to the present invention because they would not be adversely effected by moisture, and such a material with dynamic tensile and a shear strengths of, or close to, desired or acceptable values could be found, and if necessary, those values for the material could be somewhat adjusted by heat fusing portions of the nonwoven material.

From these tests it was also determined that Single Ply Facial Tissue, which we understood to be the "tissue" material suggested for use in the separable layer of the tape structure described in U.S. Pat. No. 4,310,137 (Frye) discussed in the introduction to this specification, had such a high dynamic tensile strength that it was not desirable for most uses of the tape laminate according to the present invention.

The following tests were also run to determine if separable layers 20 of certain of the materials tested were internally stable when exposed for a long time to the forces that could be applied to the separable layer 20 when the tape laminate 10 is used to support an object along a vertical surface (e.g., a framed picture from the surface of a wall); which forces include (1) a static force (generally parallel to their major or anchor surfaces that could be at least equal to the shear force that can be developed between tile outer adhesive surface of the strip and a substrate to which it is adhered, and (2) a small static torsional or cleavage force caused by pivoting of the supported object around the tape laminate 10 that applies a small static tension force to at least portions of the separable layer 20.

First the shear force that could be developed between the outer adhesive surface of the strip and a substrate to which it is adhered was determined by adhering weights to a clean smooth vertical stainless steel surface using rubber based pressure sensitive adhesive (i.e., the adhesive described in U.S. patent application Ser. No. 08/308,937 (Bries et al). That pressure sensitive adhesive was found capable of supporting, at least 6 pounds of weight per square inch of area along that vertical surface for an extended period of at least 80 days.

Pieces one square inch in area of the 1 oz./sq. yd. PP Spunbond and the 1.26 oz./sq. yd. HDPE Flashspun nonwoven materials identified above were then adhered using that adhesive between that vertical surface and a 6 pound weight and were found capable of supporting that weight along the vertical surface for over 80 days without any signs of internal separation of the tested materials.

The stability of the nonwoven materials against the small tensional force applied to the anchor surfaces 22 of the separable layer 20 by the objects in addition to the shear forces applied parallel to the anchor surfaces 22 was tested by using tape laminates 10 with separable layers 20 of different ones of the test materials that were 1 square inch in area to support 3 lb. weights from the under sides of cabinet shelves. Both of the tape laminates 10 with separable layers 20 of the 60 gm./sq. m. PP Spunbond and the 1.26 oz./sq. yd. HDPE Flash spun suspended the 3 lb. weight without failure for over 7 months. The 1.4 oz./sq. yd. PP Spunbond/ PE Meltdown laminate suspended the 3 lb. weight for 2 months before failing. When failure did occur it was a failure of the bond between the adhesive and the nonwoven test material and not an internal separation of the test material. The 34 gm./sq. yd. Rayon/PET Hydro entangled laminate failed at 25 days, however, this failure appeared also to be a failure of the bond between the adhesive and the test material which had a construction much like cheese cloth with very little surface area that could be bonded to by that adhesive. It should be possible to improve the bond between the adhesive and these nonwoven test materials by corona treating these nonwoven materials or coating them with a primer.

Thus it was determined that at least the separable layers 20 of the nonwoven materials tested were internally stable when exposed for a long time to static forces that could be applied to the separable layer 20 when the tape laminate 10 is used to support an object along a vertical surface including (1) static forces generally parallel to their major or anchor surfaces that are at least equal to the shear force that can be developed between the outer adhesive surface of the strip 12 and a substrate to which it is adhered; and (2) the small static torsional or cleavage forces caused by pivoting of the supported object around the tape laminate 10.

A very acceptable tape laminate 10 can be made from two of the strips 12 available under the commercial designation "Medium Hook Replacement Strips with "Command" (t.m.) adhesive "from Minnesota Mining and Manufacturing Company, St. Paul, Minn. Between those strips 12 is adhered an internally separable layer 20 of the 1.26 oz./sq. yd. HDPE Flashspun identified above that was 1.588 centimeter or 0.625 inch wide, and 4.064 centimeter or 1.6 inch long so that it had anchor surface 22 areas of 1 square inch or 6.45 square centimeters. The adhesive layers 34 on the strips 12 were that same width, and their lengths were shortened to correspond with the length of the separable layer 20. This tape laminate 10 is capable of supporting a static load of at least 6 pounds along a vertical surface for an extended period of time, and the force required to separate its separable layer 20 into two portions by pulling it at a right angle to its anchor surfaces is estimated to be in the range of about 8 to 10 pounds.

Figure 6:
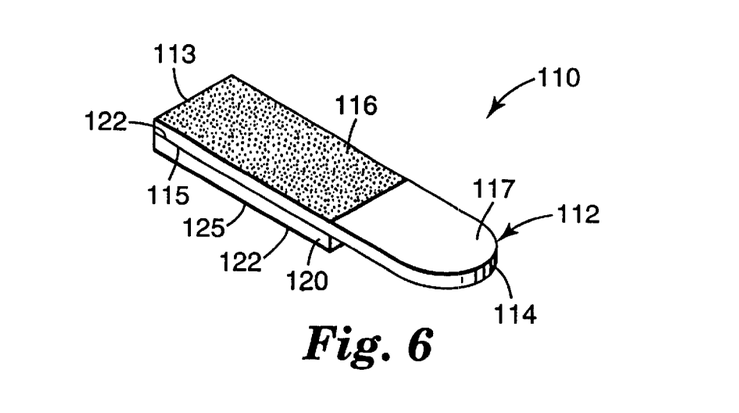
FIG. 6 is a perspective view of a second embodiment of a tape laminate according to the present invention.
Figure 7:
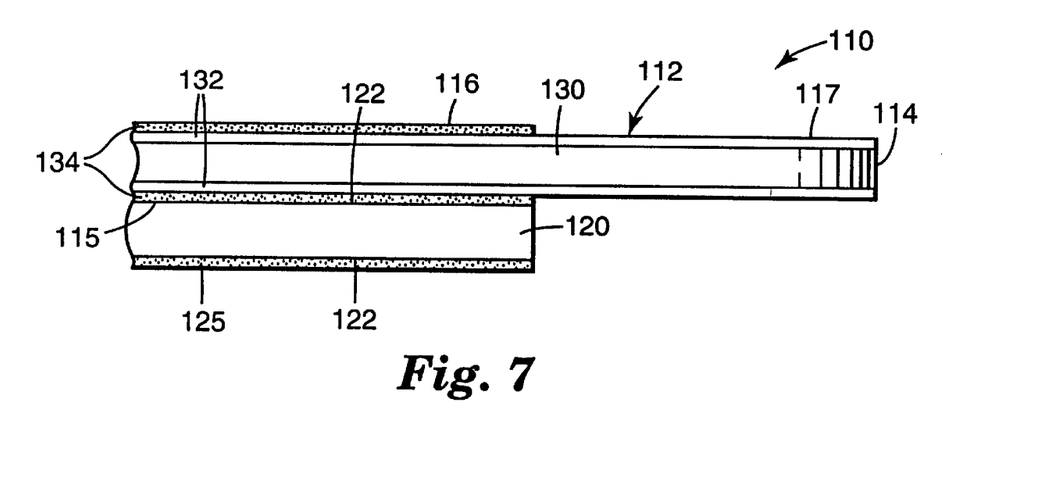
FIG. 7 is an enlarged fragmentary side view of the tape laminate of FIG. 6.

Referring now to FIGS. 6 and 7 of the drawing, there is illustrated a second embodiment of a tape laminate according to the present invention generally designated by the reference numeral 110.

Generally, the tape laminate 110 comprises a strip 112 having opposite ends 113 and 1 14, inner and outer opposite major surfaces 115 and 116 extending between its ends 113 and 114 with the outer surface 116 having at least a portion defined by pressure sensitive adhesive, and having a manually engageable tab portion 117 at its end 114. The strip 112 is stretchable by being pulled at the tab portion 117 to release engagement of its adhesive surface 116 from a substrate to which it is adhered. The tape laminate 110 also includes a separable layer 120 having opposite first and second major anchor surfaces 122. The strip 112 has its inner adhesive surface 115 bonded to a first one of the opposite anchor surfaces 122 of the separable layer 120, and the tape laminate 110 includes a layer 125 of pressure sensitive adhesive adhered over the second one of the opposite anchor surfaces 122. The separable layer 120 has an internal static shear strength in a direction parallel to its anchor surfaces 122 that is adapted to support objects between which it is attached in that direction (e.g., preferably a shear strength that is generally the same as or exceeds the highest shear strength that the pressure sensitive adhesive can develop with surfaces to which it is applied (e.g., 6 pounds per square inch)), and has an internal dynamic tensile strength in a direction generally normal to its anchor surfaces 122 selected so that it will afford internal separation of the separable layer by pulling such objects apart without damaging the surfaces of the objects to which the strips 12 are adhered (e.g., an internal dynamic tensile strength of no greater than about 40 pounds per square inch and preferably no greater than about 30 pounds per square inch measured as described herein if the tape structure is to be used to adhere an object to a strong substrate such as a ceramic material or metal with a baked on paint finish, or an internal dynamic tensile strength of about 8 to 10 pounds per square inch if the tape structure is to be used to adhere an object to a relatively weak substrate such as wall paper). When the outer adhesive surface 116 of the strip 112 and the layer of adhesive 125 on the separable layer 120 are adhered to the surfaces of two objects, the laminate 110 can support one of the objects from the other object against a significant continuous force (e.g., a continuous force of at least 6 pounds per square inch) applied in a direction generally parallel to the anchor surfaces 122 of the separable layer 120. Those objects can again be separated, however, by applying a separating force normal to those anchor surfaces 122 of no greater than about 30 pounds per square inch to internally separate the separable layer 120, after which the strip 112 can be stretched by manually engaging and pulling on its tab portion 117 to cleanly separate the strips 112 from one of the objects. The laminate 110 is intended for use where, after such separation, there is no need to remove the remains of the laminate 110 from the object to which the layer of adhesive 125 is adhered, or where the surface of that object is such that the layer of adhesive 125 can be readily removed with solvent or by scraping or otherwise. Alternatively, the layer 125 of adhesive could be of a hot melt or other type of adhesive, or the second one of the opposite anchor surfaces 122 could be adapted to be adhered or adhered to a surface of an object by other means such as flame bonding or sonic welding which could be useful if the laminate 110 was to be provided pre attached on an object such as a wall hanging, that was either intended to be hung for a period of time and then removed and disposed of, or that, if it was hung and then removed would either (1) not be significantly damaged by having the remaining portion of the laminate scraped away or otherwise removed, after which it could be again be hung using a new laminate 10 or 110 or other means, or (2) could tolerate having the remaining, portion of the laminate 110 remain attached and could again be hung using a new laminate such as the laminate 10 described above or other means at a different location alone its surface.

As illustrated in FIG. 7, the strip 112 used in the tape laminate 110 can be that described in U.S. patent application Ser. No. 08/308,937 (Bries et al) which comprises a central layer 130 of polymeric foam (e.g., closed or open cell polyolefin foam), two layers 132 of stretchable polymeric film bonded along opposite major surfaces of the layer 130 of foam, and a layer 134 of adhesive that defines the major adhesive surface 116 adhered along a major surface of one of the layers 132 of film opposite that bonded along the layer 130 of foam. Alternatively, the strip 112 could have any of the possible structures for the strip 12 described above.

Figure 8:
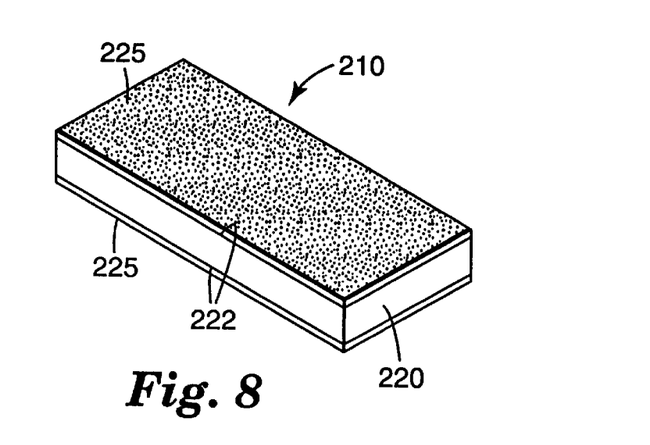
FIG. 8 is a perspective view of a third embodiment of a tape laminate according to the present invention.

Referring now to FIG. 8 of the drawing, there is illustrated a third embodiment of a tape laminate according to the present invention generally designated by the reference numeral 210.

Generally, the tape laminate 210 comprises a separable layer 220 having opposite first and second major anchor surfaces 222, and includes two layers 225 of pressure sensitive adhesive adhered over the opposite anchor surfaces 222. The separable layer 220 has an internal static shear strength in a direction parallel to its anchor surfaces 222 that is adapted to support objects between which it is attached in that direction (e.g., preferably a shear strength that at least equals or exceeds the highest shear strength that the pressure sensitive adhesive can develop with surfaces to which it is applied (e.g., 6 pounds per square inch)), and has an internal dynamic tensile strength in a direction generally normal to its anchor surfaces 222 selected so that it will afford internal separation of the separable layer 220 by pulling such objects apart without damaging, the surfaces of the objects to which the layers of adhesive 225 are adhered (e.g., an internal dynamic tensile strength of no greater than about 40 pounds per square inch and preferably no greater than about 30 pounds per square inch measured as described herein if the tape structure is to be used to adhere an object to a strong substrate such as a ceramic material or metal with a baked on paint finish, or an internal dynamic tensile strength of about 8 to 10 pounds per square inch if the tape structure is to be used to adhere an object to a relatively weak substrate such as wall paper). When the layers of adhesive 225 on the separable layer 220 are adhered to the surfaces of two objects, the laminate 210 can support one of the objects from the other object against a continuous force of at least 6 pounds per square inch applied in a direction generally parallel to the anchor surfaces 222 of the separable layer 220. Those objects can again be separated, however, by applying a separating force normal to those anchor surfaces 222 of no greater than about 30 pounds per square inch to internally separate the separable layer 220. The laminate 210 is intended for use where, after removal, there is no need to remove the remains of the laminate 210 from the objects to which the layers of adhesive 225 are adhered, or where the surface of one or both of those objects are such that the layer of adhesive 225 can be readily removed with solvent or by scraping or otherwise. Alternatively, one or both of the layers 225 of adhesive could be of a hot melt or other types of adhesive, or one or both of the opposite anchor surfaces 222 could be adapted to be adhered or adhered to a surface of an object by other means such as flame bonding or sonic welding which could be useful if the laminate 210 was to be provided pre-attached on an object such as a wall hanging that was either intended to be hung for a period of time and then removed and disposed of, or that, if it was hung and then removed, either (1) would not be significantly damaged by having the remaining portion of the laminate 210 scraped away or otherwise removed, after which it could be again be hung using a new laminate such as the laminate 10 described above or other means, or (2) could tolerate having the remaining portion of the laminate 210 remain attached and could again be hung using a new laminate such as the laminate 10 described above or other means at a different location along its surface.

The present invention has now been described with reference to three embodiments and several possible modifications thereof. It will be apparent to those skilled in the art that many changes can be made in the embodiments described without departing, from the scope of the present invention. Thus, the scope of the present invention should not be limited to the structures and methods described in this application, but only by the structures and method described by the language of the claims and the equivalents thereof.

What is claimed is:

1. A tape laminate comprising an internally separable layer having first and second opposite anchor surfaces, and means for bonding said anchor surfaces to the opposed surfaces of objects so that the laminate can support one object from the other against a static force generally parallel to said anchor surfaces, whereas the separable layer can be internally separated by a dynamic separating force normal to said anchor surfaces to separate the objects, said means for bonding comprising at least one strip having opposite ends, inner and outer opposite major surfaces extending between said ends with a portion of said outer major surface being defined by pressure sensitive adhesive and said inner major surface being bonded to one of said anchor surfaces, and a manually engageable tab portion at one end, said strip being stretchable by being pulled at said tab portion to release adhesive engagement of said outer major surface to a substrate to which said outer major surface is adhered, so that alter the tape laminate has attached two objects together with the adhesive on the outer major surface of said strip adhered to one of the objects and the second anchor surface of the separable layer bonded to the other, and the separable layer has been internally separated by a dynamic separating force to separate the objects, the strip can be stretched by manually engaging the tab portion to separate the strip from the object to which it was adhered.

2. A tape laminate according to claim 1 wherein said means for bonding comprises two strips each having opposite ends, inner and outer opposite major surfaces extending between said ends with a portion of said outer major surface being defined by pressure sensitive adhesive and said inner major surface being bonded to a different one of said anchor surfaces, and a manually engageable tab portion at one end, said strips each being stretchable by being pulled at said tab portion to release adhesive engagement of said outer major surface to a substrate to which said outer major surface is adhered, so that after the tape laminate has attached two objects together with the adhesive on the outer major surface of each of said strips adhered to a different one of the objects, and the separable layer has been internally separated by a dynamic separating force to separate the objects, the strips can both be stretched by manually engaging said tab portions to separate the strips from the object to which they were adhered.

3. A tape laminate according to claim 1 wherein said separable layer has a dynamic internal strength in a direction generally normal to said anchor surfaces of no greater than about 40 pounds per square inch.

4. A tape laminate according to claim 1 wherein said separable layer has a dynamic internal strength in a direction generally normal to said anchor surfaces in the range of about 8 to 30 pounds per square inch.

5. A tape laminate according to claim 1 wherein the force required to separate said separable layer when applied in a direction generally normal to said anchor surfaces is no greater than about 10 pounds.

6. A tape laminate according to claim 1 wherein said separable layer is a nonwoven layer primarily of thermoplastic fibers.

7. A tape laminate according to claim 6 wherein said thermoplastic fibers are of one or more materials selected from the materials consisting, essentially of polyethylene, polypropylene, polyester, nylon, rayon and polyurethane.

8. A tape laminate according to claim 1 wherein said separable layer comprises materials consisting essentially of polymeric foam, cellulose material, and corrugated paper.

9. A tape laminate according to claim 1 wherein said strip comprises a layer of pressure sensitive adhesive defining said inner and outer major surfaces.

10. A tape laminate according to claim 2 wherein said strips each comprise a layer of pressure sensitive adhesive defining said inner and outer major surfaces.

11. A tape laminate according to claim 1 wherein said strip comprises a layer of pressure sensitive adhesive defining said outer major surface, and a layer of polymeric material having a major surface to which said layer of pressure sensitive adhesive is adhered.

12. A tape laminate according to claim 2 wherein said strips each comprise a layer of pressure sensitive adhesive defining said outer major surface, and a layer of polymeric material having a major surface to which said layer of pressure sensitive adhesive is adhered.

13. A tape laminate according to claim 1 wherein said strip comprises a layer of pressure sensitive adhesive defining said outer major surface, a first layer of stretchable polymeric material having opposite major surfaces with one major surface of the first layer of stretchable polymeric material bonded to said layer of pressure sensitive adhesive, a layer of polymeric foam having opposite major surfaces with one major surface of said layer of foam bonded on the surface of said first layer of polymeric material opposite said layer of pressure sensitive adhesive, and a second layer of polymeric material having opposite major surfaces with one of the major surfaces of said second layer of polymeric material adhered to the major surface of said layer of foam opposite said first layer of polymeric material.

14. A tape laminate according to claim 2 wherein said strips each comprise a layer of pressure sensitive adhesive defining said outer major surface, a first layer of stretchable polymeric material having opposite major surfaces with one major surface of the first layer of stretchable polymeric material bonded to said layer of pressure sensitive adhesive, a layer of polymeric foam having opposite major surfaces with one major surface of said layer of foam bonded on the surface of said first layer of polymeric material opposite said layer of pressure sensitive adhesive, and a second layer of polymeric material having opposite major surfaces with one of the major surfaces of said second layer of polymeric material adhered to the major surface of said layer of foam opposite said first layer of polymeric material.

15. A tape laminate according to claim 1 wherein said separable layer has an internal static shear strength in a direction parallel to said anchor surfaces that is about equal to or exceeds the maximum static shear strength that said layer of pressure sensitive adhesive can develop with normal surfaces.

16. An internally separable tape laminate which can be removably affixed between opposed support surfaces, comprising:
(a) a nonwoven internally separable layer formed primarily of thermoplastic fibers, said separable layer having opposite major surfaces; and
(b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface.

17. A tape laminate according to claim 16 wherein said thermoplastic fibers are one or more materials selected from the materials consisting essentially of polyethylene, polypropylene, polyester, nylon, rayon, and polyurethane.

18. An internally separable tape laminate which can be removably affixed between opposed support surfaces, comprising:
(a) an internally separable layer having opposite major surfaces; and
(b) a stretch releasing adhesive bonding strip adhesively bonded to at least one of said opposite major surfaces for adhering the tape laminate to one of the support surfaces and selectively releasing the tape laminate therefrom, thereby allowing the tape laminate to be cleanly removed from the support surface.

19. An internally separable tape laminate which can be removably affixed between opposing support surfaces, comprising:
(a) an internally separable layer having opposite major surfaces, said separable layer having an internal dynamic tensile strength in a direction generally normal to said major surfaces of no greater than 35 pounds per square inch when tested as described in this specification; and
(b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface.

20. An internally separable tape laminate which can be removably affixed between opposed support surfaces, comprising:
(a) an internally separable layer having opposite major surfaces; and
(b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface.

21. An internally separable tape laminate as defined in claim 20, wherein said bonding strip includes a first end portion with an inner surface affixed to one of said separable layer opposite major surfaces and an outer adhesive surface adapted for attachment with one of the support surfaces, and a second end portion forming a manually engageable tab, said bonding strip further including:
(a) a central layer having opposite major surfaces;
(b) film layers bonded along said central layer opposite major surfaces and
(c) adhesive layers adhered along at least a portion of said film layers.

22. An internally separable tape laminate which can be removably affixed between opposed support surfaces, comprising:
   (a) an internally separable layer having opposite major surfaces; and
   (b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface, said bonding strip having a lengthwise elongation at break of from about 50% to about 1200%.

23. An internally separable tape laminate which can be removably affixed between opposed support surfaces, comprising:
   (a) an internally separable layer having opposite major surfaces; and
   (b) a stretch releasing adhesive bonding strip arranged on at least one of said opposite major surfaces for adhering the tape laminate to one of the support surfaces and selectively releasing the tape laminate therefrom after being stretched at an angle no greater than about 35° from the support surface without the backing rupturing prior to the removal of the tape from the support surface and without leaving substantial pressure-sensitive adhesive residue on the support surface.

24. An internally separable tape laminate which can be removably affixed between opposed support surfaces, comprising:
   (a) an internally separable layer having opposite major surfaces; and
   (b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface, said stretch releasing strip comprising a single layer of pressure-sensitive adhesive.

25. An internally separable tape laminate which can be removably affixed between opposed support surfaces, comprising:
   (a) an internally separable layer formed primarily of corrugated paper, said separable layer having opposite major surfaces; and
   (b) a stretch releasing adhesive bonding strip arranged on at least one of said opposite major surfaces for adhering the tape laminate to one of the support surfaces and selectively releasing the tape laminate therefrom, thereby allowing the tape laminate to be cleanly removed from the support surface.

* * * * *

UNITED STATES PATENT AND TRADEMARK OFFICE
CERTIFICATE OF CORRECTION

PATENT NO.: 6,004,642

DATED: December 21, 1999

INVENTOR(S): Nathaniel P. Langford

It is certified that error appears in the above-identified patent and that said Letters Patent is hereby corrected as shown below:

Col. 12, line 38, "alter" should read --after--.

Col. 13, line 14, "consisting, essentially" should read --consisting essentially--.

Signed and Sealed this

Fifth Day of September, 2000

Attest:

Q. TODD DICKINSON

Attesting Officer

Director of Patents and Trademarks